US006919918B2

(12) United States Patent
Carretero Guerrero

(10) Patent No.: US 6,919,918 B2
(45) Date of Patent: Jul. 19, 2005

(54) ELECTRONIC DIGITAL DOOR OPENER

(75) Inventor: Joaquin Carretero Guerrero, Valencia (ES)

(73) Assignee: Miniaturas Technologicas, S.A., Valencia (ES)

( * ) Notice: Subject to any disclaimer, the term of this patent is extended or adjusted under 35 U.S.C. 154(b) by 682 days.

(21) Appl. No.: 10/096,073

(22) Filed: Mar. 12, 2002

(65) Prior Publication Data

US 2002/0118283 A1 Aug. 29, 2002

Related U.S. Application Data

(63) Continuation of application No. PCT/ES01/00261, filed on Jul. 2, 2001.

(30) Foreign Application Priority Data

Jul. 13, 2000 (ES) .......................................... 200001752

(51) Int. Cl.[7] ............................................... H04N 7/18
(52) U.S. Cl. ...................................................... 348/156
(58) Field of Search ................................ 348/156, 155, 348/143, 159, 152, 161; 340/539, 531; 379/102.06, 93.17, 167

(56) References Cited

U.S. PATENT DOCUMENTS

| | | | | |
|---|---|---|---|---|
| 4,524,384 A | * | 6/1985 | Lefkowitz et al. ........... | 348/156 |
| 5,717,379 A | * | 2/1998 | Peters ........................ | 340/539 |
| 6,049,598 A | * | 4/2000 | Peters et al. ............ | 379/102.06 |

FOREIGN PATENT DOCUMENTS

| | | | |
|---|---|---|---|
| DE | 42 25 741 A1 | 9/1993 | |
| EP | 0964579 A1 | 12/1999 | ............ H04N/7/18 |
| EP | 1052840 A1 | 11/2000 | .......... H04M/11/02 |
| ES | 2133125 A1 | 7/1999 | ............ H04N/7/18 |
| WO | WO 94/10804 | 5/1994 | ............ H04N/7/18 |

* cited by examiner

Primary Examiner—Chris Kelley
Assistant Examiner—Behrooz Senfi
(74) Attorney, Agent, or Firm—Klauber & Jackson

(57) ABSTRACT

The invention relates to an electronic digital door opener, comprising a digitilisation, recording and control block (2) that is connected between the street plate (1) and the interior plates (3, 3', 3"). Said block (2) has sound recording, playback and processing means, video and data sequencing, in addition to means for controlling functions of the door opener. Each interior plate (3', 3") can be complemented with a remote control (4) to enable audio and data communication with the street plate (1). Audiovisual and data communication with said plate (1) can be enabled by means of a television set (60). A portable, mobile unit (4') with television function enables audiovisual and data communication with the street plate (1) either directly or by means of a television set (60). Each interior plate and the digitization, recording and control block may be connected to a remote localization module (5) that makes it possible to relate audio, video and data communication and the controls of the door opener with a remote computer (70), remote telephone (80) or the like.

12 Claims, 6 Drawing Sheets

ELECTRONIC DIGITAL DOOR OPENER

This is a continuation application under 37 CFR 1.53(b) of international application Number PCT ES01/00261, filed Jul. 2, 2001 entitle, ELECTRONIC DIGITAL DOOR OPENER

OBJECT OF THE INVENTION

This invention, as expressed in the wording in this descriptive report, refers to a digital electronic door opener that has an electronic door opener system, whose main purpose consists of permitting the recording of audiovisual messages via the street plate. These messages will be able to be reproduced layer, in the corresponding interior plate, on a television set or by means of remote devices. Furthermore, thanks to the inclusion in the system of various analogue input and output connectors, together with a serial bus for free use, home automation and alarm type functions can be added.

On the other hand, diverse modules can be added to the equipment to provide it with the most advanced services.

Thus, by means of including a remote localization module, the dialogue between the person who is calling the dwelling and the owner is made possible, the latter being able to open the door corresponding to the entrance hall at any moment, from the place where he is, with the aid of a telephone.

Other purposes of this remote localization module are the implementation of a telephone function (that permits the sending and receiving of telephone calls), the answer phone function (that makes the recording of and listening to messages possible from any telephone) and remote connection, so that the system can be totally controlled and messages reproduced or sent via a remote connection.

On the other hand, by adding a remote control module the system permits observation and dialogue with the person who is calling via the street plate without the need to move around; being able to base ourselves on the television set or on the monitor of the interior plate, or on a screen of a portable mobile unit for visual communication; this screen furthermore having the function of a conventional portable television set. It is also possible to view menus for configuring the system by pressing different keys on the said portable mobile unit, on a remote control or on the interior plate.

It is possible to make two different implementations of the electronic door opener. The first of these consists of the implementation of an electronic door opener for collective use, considered for use in an owners' association of a block of dwellings, whatever its size. Another implementation, simpler than the above, would be that of an electronic door opener that we shall call for being of individual use, anticipated for use installed in a house and single family dwellings in general or buildings where the distinction of rooms is not necessary for attending to access same.

BACKGROUND OF THE INVENTION

Automatic door openers applied to dwellings which consist of an intercommunication system or telephone that communicates the porch with each of the dwellings are well-known, also including a system for calling each dwelling, while each dwelling includes a pushbutton for opening the porch door. These door openers tend to include a monitor in the interior plate by which one can see the scenes occurring in the corresponding entrance hall of the building at the same time that one is listening. In this way, the people who are in the dwellings can decide whether to open the porch door after receiving a call or not.

Modules also exist of automatic door openers that reproduce an audio message pre-recorded in the factory as an automatic answer phone, after a particular event has occurred, such as an alarm going off, or the absence of the owner. Other more advanced ones also permit the capture of a digital image (photogram) in the case of the absence of the owners, which can be viewed later on the monitor of the interior plate.

On the other hand, radio-frequency circuits are also known which, after an adaptation has been made to the electronic door opener systems, perform functions such as opening the door for access to the building via a remote control or permitting the scenes occurring in the entrance hall to be viewed on the television set. These systems, in the majority of cases, use the down cable of the collective antenna of the building for introducing audiovisual signals from the entrance hall to the dwellings, in such a way that they can be reproduced by tuning the television set to a particular channel.

Other radio transmission systems are also known, such as cordless telephones and certain television signal transmitter and receiver circuits, that permit the television set to be viewed at any point in the dwelling without the need for installing cableform.

For some time now, alarm or surveillance systems have been appearing on the market that have a function for remote localization of owners in the case of their being triggered. Thanks to the appearance of high speed telephone lines, some of these systems permit the incorporation of external modules for transmitting audiovisual sequences in the case of an intrusion.

In the same way, home automation systems, or comfort systems are known that permit the device to be turned off and on, simulation of presence, energy saving, etc. The most advanced home automation systems even permit their handling via remote telephones by means of audio guided menus.

Provided with multimedia technology, videoconferencing systems between computers are well-known, used to transmit bi-directional audiovisual sequences, together with video-telephones that permit a call to be established, making the simultaneous transmission of images possible.

The recently appeared standard, called WAP (wireless application protocol), still under development, is also known, that permits us to connect with a Web page server via a mobile telephone. By means of a WAP connection, we can reproduce the contents of Web pages on the liquid crystal display of the mobile telephone, whether in a text or audiovisual context. The use of mobile telephones, provided with the WAP technology, will permit the UMTS technology to reproduce messages with an audiovisual content at a certain speed, when it comes into force, within the telecommunications market.

On the other hand, the patent for the Spanish invention with the publication number 2,133,125 and stated as a "cordless telephone tele-door opener" is well known. This patent has a cordless telecommunication system for sound and image that includes a base and a portable that establishes communication with the external public telephony system and with the particular internal video for the door opening system on the environment of a building of dwellings. The portable is a mobile radio-electric station that permits the bell of the person calling at the porch door of the building to be heard, to be seen, to talk to him/her and to open the porch door, as well as permitting all the services of the public telephone system. The aforementioned base is a fixed radio-electric station with cover for the interior of a dwelling, that has the same functions as the portable. Although the system of this patent has advantages with reference to using the portable telephone as a cordless video door opener and as a public telephone, it also has inconveniences, such as not permitting audiovisual messages to be recorded and reproduced, not anticipating connection to a local or remote PC, not permitting the possibility of alarm or home automation functions, not considering the possibility of using it as a portable television set and not having a remote localization module.

In the previous paragraphs of this section, we briefly described devices, systems and technologies related to the invention, indicating their most relevant aspects. Let us no look at those characteristics that, in our opinion, differentiate the system that we propose from those already existing.

Electronic door opening systems conceived from their creation for performing functions such as recording audiovisual messages in the absence of the owners and their later reproduction on an interior plate, on a conventional television set, on a telephone or on a portable device are not known.

Neither are electronic door opening devices known that permit the re-recording of messages of absence as often as necessary or a change in the audible sound of the bell for helping people with hearing problems.

In the same way, electronic door opening devices are not known that can be configured and controlled entirely via a portable device that includes a small viewing screen on which the text menus for configuration can be seen and which can be remotely handled by means of a computer, telephone or similar.

Neither are automatic door opening systems known that permit the remote localization of owners and the reproduction of messages recorded via the telephone, it being possible to be helped in the actions to be performed by means of reproducing audio messages.

Neither do we know of the existence of automatic door opening systems that permit the connection of input and output devices for simulating alarm functions and making home automation functions possible by means of a serial bus and also for performing the functions of an automatic answer phone, a cordless telephone and a portable television set.

Electronic door opening systems that permit audiovisual scenes to be recorded for security purposes and which are useful in the case of police action are not known.

Finally, we are unaware of electronic door opening and message systems that are prepared for adaptation to the WAP technology, with the object of real time reproduction of the audiovisual messages recorded in the system and the viewing of scenes in the entrance hall via a liquid crystal display that is included in the most modern mobile telephones.

DESCRIPTION OF THE INVENTION

In order to achieve the objectives and avoid the inconveniences indicated in previous sections, the invention consists of a digital electronic door opener that has a street plate provided with a video camera, microphone, loudspeaker, keyboard and door opener switch indicators at the very least; this street plate being connected to one or more interior plates in the dwellings, in such a way that audiovisual communication is made possible between the street plate and the interior plates and also the opening of the corresponding porch door or access by an order from any of the interior plates. As far as here, the structure is analogous to the known video door opening systems.

What is new, according to the invention, is that the aforementioned electronic door opener has a digitalisation, registration and control block that is connected between the street plate and the interior plates; this block having means for the registration, reproduction and processing of sound and video and data sequencing, together with the control means for the door opener functions. Each interior plate can be optionally supplemented by means of a remote control module that can be a remote control that permits audio and data communication with the street plate and audiovisual communication with the said street plate via a television set; said remote control unit also being able to be a portable mobile unit provided with a display that permits audiovisual and data communication with the street plate, either directly, or by means of a television set, this portable mobile unit also being permitted the function of a portable television set. Each interior plate, together with the digitalisation, registration and control block is optionally connectable to a remote localization module that permits the audio, video, data and control communications of the door opener with a remote computer, remote telephone, or similar via a telecommunications network. According to requirements, the following door opener configurations will be possible for every user:

A first configuration or basic configuration made up of a street plate, digitalisation, registration and control block and a remote control.

A second configuration made up of a street plate, interior plate, digitalisation, registration and control block and a remote control.

A third configuration made up of a street plate, interior plate, digitalisation, registration and control block and a remote localization module.

A fourth configuration made up of a street plate, interior plate, digitalisation, registration and control block, remote control and a remote localization module.

A fifth configuration or portable basic configuration made up of a street plate, interior plate, digitalisation, registration and control block and a portable mobile unit.

And a sixth configuration made up of a street plate, interior plate, digitalisation, registration and control block, portable mobile unit and a remote localization module.

The street plate and the digitalisation, registration and control block are shared by all the users in a door opener installation that has a number of interior plates and any combination of the aforementioned six configurations. Any of the said six configurations makes security functions, such as the capture of video sequences of the person calling at the door opener, possible.

According to the preferred execution of the invention, the aforementioned digitalisation, registration and control block include:

Analogue/digital converters that permit the digitalisation of audio and video signals and are essential in the case of the corresponding installation sensors (cameras, microphones) having digital outputs.

Analogue/digital converters with an inverse function to the above which permit the original audio and video analogue signals to be reconstructed.

Compressors that permit the audio and video signals to be compressed with the object of occupying less space when stored in the memory.

De-compressors with an inverse function to the above that permit the compressed signals to be de-compressed before delivering them to the analogue/digital converters.

Video processor that permits zoom, rotating, filtering, contrasting and other operations to be performed with the video images captured.

Audio processor that permits equalising, filtering, distorting and other operations to be performed with audio sounds.

Read/write storage memories that permit digitalised audio and video signals to be stored.

Main processor that attends to the orders from the street plate and interior plates, enabling/disabling different elements of the system, which permits the opening of the access controlled by the door opener, which establishes communications with existing processors in the interior plates and which supervises and controls the capture, sending, synchronising and reproducing of audio, video and data signals. Software can be implemented in this processor with the functions of compressing, processing and de-compressing to be able to do away with the previous compressors, de-compressors, video processor and audio processor in the block.

Main memory that permits the data base which makes up the system to store access keys, date and time of the calls, telephone numbers for remote localization and other data.

Amplifying and filtering stages which permit audio, video and data signals to be amplified and stored.

In the aforementioned preferred execution, and for the first and third configurations of the door opener described above, the interior plate will have:

A keyboard connected to a processor in the dwelling by means of which the user acts to open the access controlled by the door opener, reproduce audiovisual messages, record messages of absence, enter telephone numbers for urgent localization and, in general, select options on the menu for configuring the door opening system.

Indicators that show the status of the door opening system at all times, facilitating an indication of whether there are any recorded messages, any fault or other indications.

A microphone that permits capture of the audio that the person who has called from the street plate will listen to.

A loudspeaker that permits the audio captured by the street plate to be listened to together with the audio corresponding to recorded messages; it being possible to direct signals received by this loudspeaker to a television set outside the interior plate by means of an "exterior audio" connector and via a cable or radio frequency system.

A device for writing on the screen that permits the writing of characters and symbols on monitors and screens, it being possible for this writing to be overlapped with video signals; this device facilitating the creation of text menus for the configuring of the system that can be viewed on a monitor in the interior plate and/or on the aforementioned television set.

A monitor that permits viewing of the images captured by the camera in the street plate, together with the images recorded by means of the digitalisation, registration and control block, also permitting the viewing of the menus for the configuration of the system; it being possible to direct the signals received by this monitor to a television set outside the interior plate by means of an "exterior video" connector and via a cable or radio-frequency system.

A processor in the dwelling communicating with the main processor in the digitalisation, registration and control block, which is selected and identified by the latter in the corresponding communications, this processor in the dwelling moreover being employed to execute orders coming from the keyboard of the interior plate, enable/disable the indicators in the interior plate and generate menus employing the writing device on the screen.

A read/write memory that permits data employed by the system such as telephone numbers of those to advise in the case of a need for localization, number of non-viewed messages recorded, personal access keys, menu screens and others to be housed.

A connector block that includes the "exterior video" and "exterior audio" inputs for sensors and supply and a serial output bus for acting on external devices at the very least; this connector block having the possibility of being connected to a home automation and/or alarm centre system.

An acoustic warning or bell that permits indicating that there is a call on the street plate, which can be supplemented or substituted by a warning with sound that can be modified for people with hearing deficiencies, indicating lights and pre-recorded verbal messages.

According to the preferred execution of the invention, the interior plate for the second and fourth configurations of the door opener has all the elements described for the interior plate in the first and third configurations of the door opener, and also has:

A transmitter on a television channel that permits radio transmission of a signal with audio and video components from the street plate, or the digitalisation, registration and control block which is transmitted to a television set outside the interior plate; making it possible to view and hear the image and sound facilitated by the monitor and the loudspeaker of the interior plate in the aforementioned televisions by tuning in a channel corresponding to the aforementioned transmission.

A data transceiver that permits the transmission/reception, preferably via radio or infrared, of digital commands and data between the processor in the dwelling of the interior plate and a control circuit in the remote control used in the aforementioned second and fourth configurations.

An audio receiver that permits the signal captured by a microphone of the aforementioned remote control to be received preferably by radio or infrared, this signal being directed to the loudspeaker in the street plate, a modem in the remote localization module or the digitalisation, registration and control block.

On the other hand, in the aforementioned preferred execution, the remote control used in the second and fourth configurations of the door opener will have:

A control circuit with which to connect the other control elements that governs the functioning of same.

A supplementary data transceiver to the data transceiver referred to for the second and fourth configurations of the system and analogous to this.

A microphone that makes dialogue with the person calling from the street plate possible, together with the recording of messages in the digitalisation, registration and control block.

A loudspeaker that will permit the reproduction of the audio from the street plate and the audio of the messages recorded in the digitalisation, registration and control block.

A keyboard that will permit the governing of the entire door opener system that is analogous to the keyboard described for the interior plate of the first and third configurations of the door opener.

Illuminated and/or sound indicators that permit the user to be warned of messages pending and external calls, also facilitating support functions for people with hearing deficiencies.

A battery block, rechargeable or not, that gives the remote control autonomy.

An audio transmitter that transmits the signal captured by the aforementioned microphone to the audio receiver of the interior plate described for the second and fourth configurations of the door opener.

An audio receiver analogous to the audio receiver described for the second and fourth configurations of the door opener which permits the audio component of the signal transmitted by the transmitter in the television channel to be captured, also described for the second and fourth configurations of the door opener.

In the preferred execution of the invention, the fifth and sixth configurations of the door opener will have:

A device for writing on the screen analogous to the device for writing on the screen described for the interior plate in the first and third configurations of the door opener, in this case viewing the text menus created on a television set outside the interior plate and/or an existing screen on the portable mobile unit employed in these fifth and sixth configurations.

A processor in the dwelling analogous to the processor in the dwelling referred to for the interior plate in the first and third configurations of the door opener but, with respect to those that act, it being the keyboard and the indicators belonging to the aforementioned portable mobile unit.

A memory analogous to that referred to for the interior plate in the first and third configurations of the door opener.

A connector block analogous to that referred to for the interior plate in the first and third configurations of the door opener, being able to direct the signals corresponding to the "exterior video" and "exterior audio" outputs of the door opener to a television set outside the interior plate and by means of a cable or radio frequency system.

An acoustic warning device or bell analogous to the one referred to for the interior plate of the first and third configurations of the door opener.

An audio receiver analogous to the one referred to for the second and fourth configurations of the door opener, in this case being the microphone that receives the audio signal belonging to the portable mobile unit used in the fifth and sixth configurations of the door opener.

A data transceiver analogous to the one referred to for the interior plate of the second and fourth configurations of the door opener which, in this case, permits the transmission/reception, preferably via radio or infrared, of digital commands and data between the processor in the dwelling of the interior plate and a processor circuit of the portable mobile unit used in the fifth and sixth configurations of the door opener.

An audiovisual signal transmitter that permits the transmission via radio of audiovisual signals from the street plate or the digitalisation, registration and control block, which are transmitted both to the a television set outside the interior plate and to an existing audiovisual signal receiver in the aforementioned portable mobile unit; a switch existing in this transmitter that permits the aforementioned audiovisual signals to be selected for transmission, or those corresponding to "exterior video" and "exterior audio" inputs in which a television set outside the interior plate is connected, with the object of the portable mobile unit being able to receive any television channel via its audiovisual signal receiver.

According to the preferred execution of the invention, the portable mobile unit employed in the fifth and sixth configurations of the door opener has:

A small screen or monitor, preferably of the LCD type in colour.

A small loudspeaker for listening to the audio signals.

An audiovisual signal receiver that connects to the previous loudspeaker screen and which permits the reception of audiovisual signals from the audiovisual signal transmitter of the previous interior plate used in the aforementioned fifth and sixth configurations.

A microphone for audio capture transmitted by the portable mobile unit.

An audio transmitter connected to the aforementioned microphone that transmits audio signals to the audio receiver of the interior plate used in the said fifth and sixth configurations.

A data transceiver supplementary to the data transceiver described for the interior plate of the fifth and sixth configurations of the door opener and analogous to it.

A processor circuit that governs the aforementioned data transceiver, audio transmitter and audio signal receiver, also controlling the entire functioning of the portable mobile unit.

A keyboard analogous to the one described for the remote control used in the second and fourth configurations of the door opener.

Indicators analogous to those described for the remote control used in the second and fourth configurations of the door opener.

A battery block analogous to that referred to for the remote control used in for the second and fourth configurations of the door opener but which, in this case, provides the portable mobile unit with autonomy.

According to the preferred execution of the invention, the remote localization module employed, in the third, fourth and sixth configurations of the door opener, consists of a modem that connects by one part with a telephone line and by the other with the corresponding interior plate, this modem being able to be integrated in the aforementioned interior plate. This remote localization module makes the automatic answer phone functions possible in the door opener. The aforementioned modem can be of the GSM, GPRS, UMTS type or another and can consist, in general, of a cordless data transmission module.

The portable mobile unit referred to previously can have an appearance similar to that of a cordless telephone.

With the structures described for the door opener in the invention, numerous functions are possible. Thus, the basic configuration or first configuration of the door opener permits:

Audiovisual messages directed to the owners of a dwelling to be recorded via the street plate.

Audiovisual messages directed to the entire neighbours association to be recorded via the street plate.

Messages to be deleted.

Personal absence messages to be recorded.

The absence message to be modified via the interior plate.

All the functions of the system to be optionally protected by means of access codes.

Audiovisual messages to be reproduced via the interior plate.

The audible sound of the bell to be modified, to help people with hearing problems.

Access to the total configuration of the system by means of text menus that can be viewed on the monitor of the interior plate or on a television set.

The automatic recording of the person ringing any bell in the building to be able to identify them in the case of an attempt being made on the security of the building or its owners.

External devices for entry (presence, smoke, damp, temperature sensors, etc.) or exit (sirens, relays, door openers, contacts, etc.) to be enabled/disabled (alarm function).

Connecting of external devices by means of a serial bus, supporting protocols such as RS232, CAN, 12C, etc. (home automation functions)

By adding the remote localization module to the basic configuration, that is the third configuration of the door opener, the following other functions will be added to the functions described for the basic configuration:

Locating of the owners by using telephone lines.

Reproducing messages recorded using a telephone outside the dwelling.

Making/receiving external telephone calls via the interior plate (telephone function).

Recording external audio messages in the case of absence (automatic answering function).

Modifying the absence message and the answer phone message from any remote telephone.

Warning the owners, police or an alarm centre, in the case of external sensors being triggered.

Enabling/disabling different electrical devices remotely.

Sending/receiving orders and commands to/from home automation systems installed in the dwelling.

Using audio menus, as a guide for inter-operating with the system remotely.

Configuring the system and also reproducing or recording messages via a remote computer using software.

On the other hand, if a remote control module is added to the basic configuration, that is, the second configuration of the door opener, this will have these other functions as well as the functions described for the basic configuration:

Reproducing messages on the television set of the dwelling.

Controlling the system as a whole with the support of text menus, shown on the television screen.

Speaking with the person in the entrance hall via the remote control.

Recording audio messages directed to a particular neighbour or to all the members of the owners' association via the remote control.

In general, performing all the functions that could be performed via the interior plate in the basic configuration via the corresponding remote control.

On the other hand, if the portable mobile unit is added to the basic configuration, that is, the fifth configuration of the door opener, the door opener can do the following as well as the functions described for the second configuration:

Reproduce audiovisual scenes on the screen incorporated in the said portable mobile unit.

Configure the system with the support of text menus that will appear on the aforementioned screen.

Show external video signals as the television signal on the monitor or screen of the portable mobile unit (portable television function).

On the other hand, the fourth configuration of the door opener makes the functions referred to for the second configuration and for the third configuration possible.

Finally, the sixth configuration of the door opener has the functions referred to for the third configuration and the fifth configuration.

In order to facilitate a greater comprehension of this descriptive report and forming an integral part of same, some figures are included below showing the object of the invention in an illustrative manner but in no way limiting.

DESCRIPTION OF AN EMBODIMENT OF THE INVENTION

A description of an example of the invention is given below, with reference to the numbering adopted in the figures.

Figure 1:
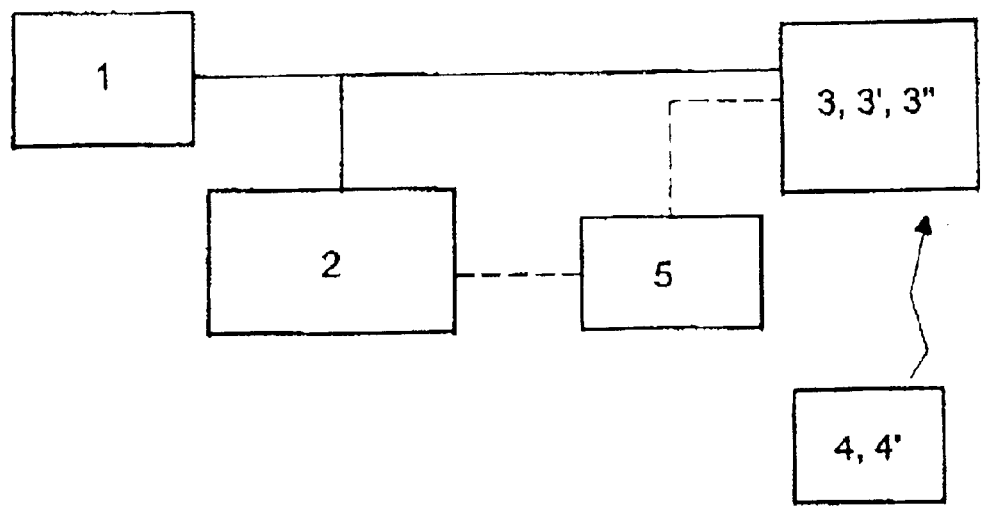
FIG. 1.—This shows a general schematic of a digital electronic door opener made according to the present invention.
Figure 2:
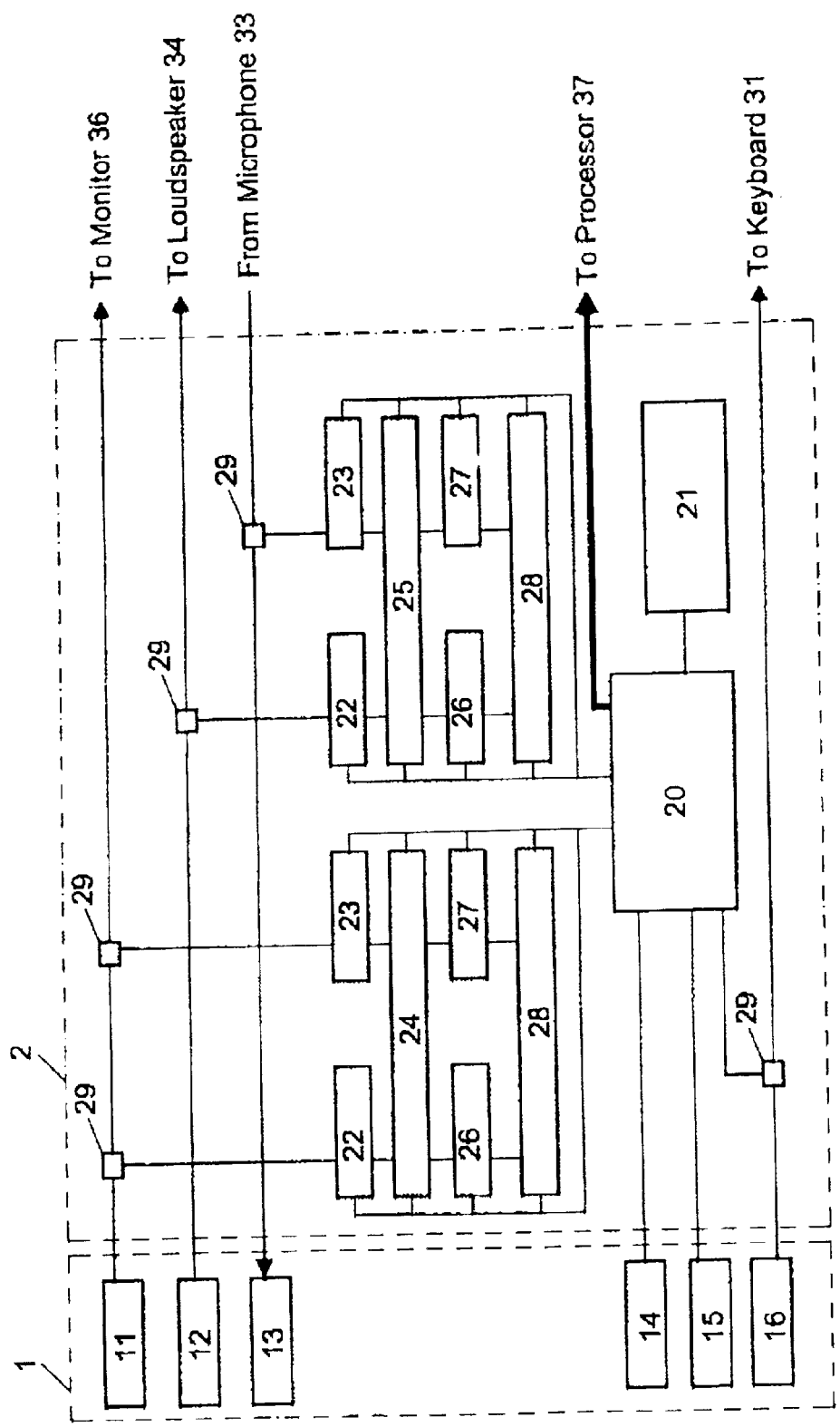
FIG. 2.—This shows schematically the functional blocks of elements 1 and 2 of the electronic door opener referred to in FIG. 1 above, which is employed for all the configurations of this door opener.

Thus, the digital electronic door opener, in this example of the invention, has a street plate 1 shown in FIGS. 1 and 2, which is the panel that will be located in the exterior of the entrance hall or porch. This plate 1 constitutes the user call interface and is composed of the following devices:

A video camera 11 that will permit scenes that take place in the entrance hall of the building or the room where it is located to be captured and recorded. These scenes will be able to be reproduced later, both on the monitor 36 of the interior plate 3 and on the television set or remote monitor 60.

A microphone 12 for capturing sound from the exterior of the building. The audio captured will serve for establishing conversation with people in the interior of the building or located remotely. In those cases in which there is no reply to the call/s made, it will be possible to make an audiovisual message in which the audio component will come from this microphone.

A loudspeaker 13 via which recoded messages or messages to the owners can be heard, whether conversing with us from the interior of the building or via a telephone device.

A keyboard 14 that will permit the call to the desired dwelling to be made. It will also serve for introducing access codes to the different functions of the system, in the case of the owner considering this necessary.

Indicators 15 used for getting to know the functioning of the system or alerting the person calling in the case of certain events. The loudspeaker 13 that includes the street plate 1 will often act as the system indicator.

A door opening switch 16, that allows the door or access governed by the electronic door opening system to be opened by means of orders from the interior plates 3 and/or the remote control module 4 or 4'.

The street plate 1 will be connected to one or more interior plates in the dwelling 3, 3' or 3", in such a way that audiovisual communication will be possible between the street plate 1 and the interior plates 3, 3', 3", together with the opening of the door of the corresponding porch or access through an order from any of the interior plates 3, 3' or 3". The door opener in this example also has a digitalisation, registration and control block 2 that also appears in FIGS. 1 and 2, which is connected between the street plate 1 and the interior plates 3, 3', 3" and which has means for the registration, reproduction and processing of sound, image and data, together with function control means for the door opener.

The interior plates 3' or 3" can be optionally supplemented by means of remote control modules 4 or 4'. The said remote control module can be treated as a remote control 4 that permits audio and data communication with the street plate 1, and audiovisual and data communication with the said street plate 1 via a television set 60. Furthermore, the aforementioned remote control module can be a portable mobile unit 4' provided with a screen 46 that permits audiovisual and data communication with the said street plate 1, either directly or via a television set 60 and furthermore this portable mobile unit 4' also permits the portable television function.

On the other hand, each interior plate 3, 3', 3", together with the digitalisation, registration and control block 2, is optionally connectable to a remote localization module 5 that permits the audio, video, data and control communications of the door opener to be related to a remote computer 70, remote telephone 80 or similar via a communications network 90. The door opener in this example can be structured in six different configurations, according to the requirements of each user. Thus, there are:

A first configuration or basic configuration formed of a street plate 1, interior plate 3 and digitalisation, registration and control block 2.

A second configuration formed of a street plate 1, interior plate 3', digitalisation, registration and control block 2 and remote control 4.

A third configuration formed of a street plate 1, interior plate 3, digitalisation, registration and control block 2 and remote localization module 5.

A fourth configuration formed of a street plate 1, interior plate 3', digitalisation, registration and control block 2, remote control 4 and remote localization module 5.

A fifth configuration or basic portable configuration formed of a street plate 1, interior plate 3", digitalisation, registration and control block 2 and portable mobile unit 4'.

And a sixth configuration formed of a street plate 1, interior plate 3", digitalisation, registration and control block 2, portable mobile unit 4' and remote localization module 5.

The street plate 1 and the digitalisation, registration and control block 2 will be shared by all the users in a door opener installation that has a number of interior plates 3, 3', 3" and which can have any combination of the aforementioned six configurations.

The digitalisation, registration and control block 2 will have the task of suitably handling the audiovisual signals, with the object of digitising them and storing them for later use. The physical location of the components in this block 2 will depend on the type of door opener, according to whether it is for individual or collective use. In an individual door opener, this block can be located in the interior of the building together with the monitor 36 of an interior plate 3. In the reverse case, in door openers for collective use, it will be located in the entrance hall, with the object of optimising its functioning and decreasing costs.

The digitalisation, registration and control block 2 will have the following devices:

Analogue/digital converters 22: these permit the digitising of the audio and video signals. These converters can be done away with if sensors are used whose output is digital such as CMOS cameras, for example.

Analogue/digital converters 23: these perform the inverse function of the above, re-constructing the original analogue signals, starting with previously de-compressed digital signals.

Compressors 26: these permit the compressing of audiovisual signals in a digital format, with the object of occupying the least space possible once stored in the memory.

De-compressors 27: these perform the inverse function of the above, that is to say, they take the compressed audio and video data from the memory and de-compress it suitably for later delivery to the analogue/digital converter 23. To implement the compression and de-compression functions, it is possible to use devices known as "CODECS" (encoder/decoder) which, as well as performing the two functions, permit working in real time with a video and audio signal. In the majority of cases, these devices include a screen writing device more commonly known as an "on screen display", that permits direct writing of characters on the video signal.

Audio processor 24: this consists of a device that permits performing zooms, rotation operations, filtering, contrasts, etc. with the video images captured.

Audio processor 25: analogous to the above, this is capable of performing different operations with the audio once digitised (equalising, filtering, distortions, etc.).

Storage memory 28: the system will have a memory for storing audiovisual data in real time, once digitised, whether from the exterior or the interior of the building or from telephone devices. This memory will be read/write and will contain the messages that will be recorded by people from the entrance hall of the building in the case of absence of the owners, together with the sequences captured on ringing any bell. In this way, it will permit messages to persons that call via a telephone from any of the dwellings in the building to be stored, together with messages directed to the entire community.

Main processor 20: this attends to orders from the keyboard of the street plate, uses illuminated or sound indicators for informing on the status of the action, permits remote opening of the entrance hall door whether via the manual pushbutton of the dwelling or a remote telephone and establishes communication with the processors located in the interior of the building (dwelling processors 37). Furthermore, the main processor 20 interacts with the digitalisation and control devices for supervising the capture, sending, synchronisation and reproduction of the data.

Main memory 21: the memory of this block serves for storing the database of which the system is composed, access keys, date and time of the call, telephone numbers for remote localization, etc.

Amplifying and filtering stages: these permit the analogue signals to be amplified together with the filtering of unwanted signals, with the object of obtaining a sharper and more faithful signal in the reproducers.

Both the aspect and the content of the interior plates 3, 3', 3", will depend on the type of door opener implemented. Thus, interior plate 3 for the aforementioned first and third configurations of the door opener will have the following elements:

Keyboard 31: different from street plate 1, the keyboard of this block 3 interacts with the microprocessor of the dwelling processor 37 to permit the opening of the entrance hall door, the reproduction of audiovisual messages, the recording of absence messages, the introduction of telephones for urgent localization and, in general, the selection of options on the menu for configuring the system.

Indicators 32: these show the status of the system at all times and, in this mode, it can be seen whether there are messages recorded, faults or malfunctioning.

Microphone 32: this permits the audio, that the person who has called from the street plate 1 will hear, to be captured.

Loudspeaker 34: this reproduces the audio captured from the entrance hall, together with the messages recorded. It will be possible to direct this signal to the television set 60 of the dwelling by means of a cable or radio frequency.

Device for writing on the screen 35: more commonly known as an "on screen display", that permits these devices to write characters and symbols directly on monitors and screens, which can be overlapped with the video signal. With the help of these devices, text menus can be created for configuring the system that will later be viewed on the monitor 36 of the interior plate 3, or on the television set 60.

Monitor 36: this permits viewing of the video sequences captured by the camera 11 in real time, together with the scenes recorded. In the same way, it permits viewing the system configuration menus. In the basic configuration or first configuration of the door opener, the monitor 36 will be integrated with the interior plate 3.

Dwelling processor 37: each dwelling will have a processor 37 that will permit communication with its homonym in the entrance hall (main processor 20), the communication protocol being supported between the two. For collective use systems, the main processor 20 will have the task of selecting the dwelling processor 37 that has to reply and also identifying the processor 37 that is transmitting a particular order. The dwelling processor 37, on the other hand, will also execute the orders coming directly from keyboard 31. When required, it will use the indicators 32 to alert the user of the status of the system and the writing device on screen 35 for generating menus.

Memory 38: plate 3, located in the dwelling, will have a read/write memory where the variables that serve the system for operating correctly will be deposited. In this memory, the system will store the telephone numbers to advise in the case of an urgent need to locate the owners, the number of non-viewed messages, personal access codes, menu screen, etc.

Figure 3:
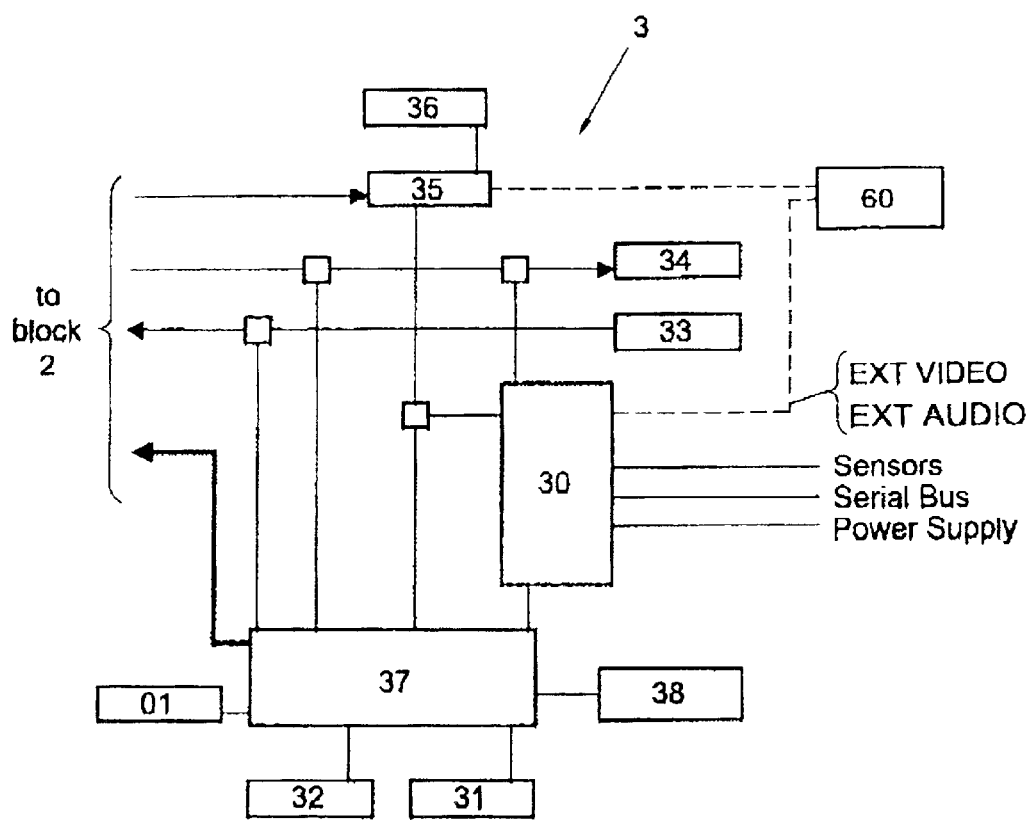
FIG. 3.—This shows schematically the functional blocks of the interior plate (3) employed for a first configuration of the electronic door opener referred to in FIG. 1 above.

The interior plate 3, as shown in FIG. 3, also has a connector block 30 that has external video and external audio outputs, together with outputs for sensors, a serial bus and supply. Furthermore, this interior plate 3 has a bell or acoustic warning device 01 connected to the dwelling processor 37.

Figure 5:
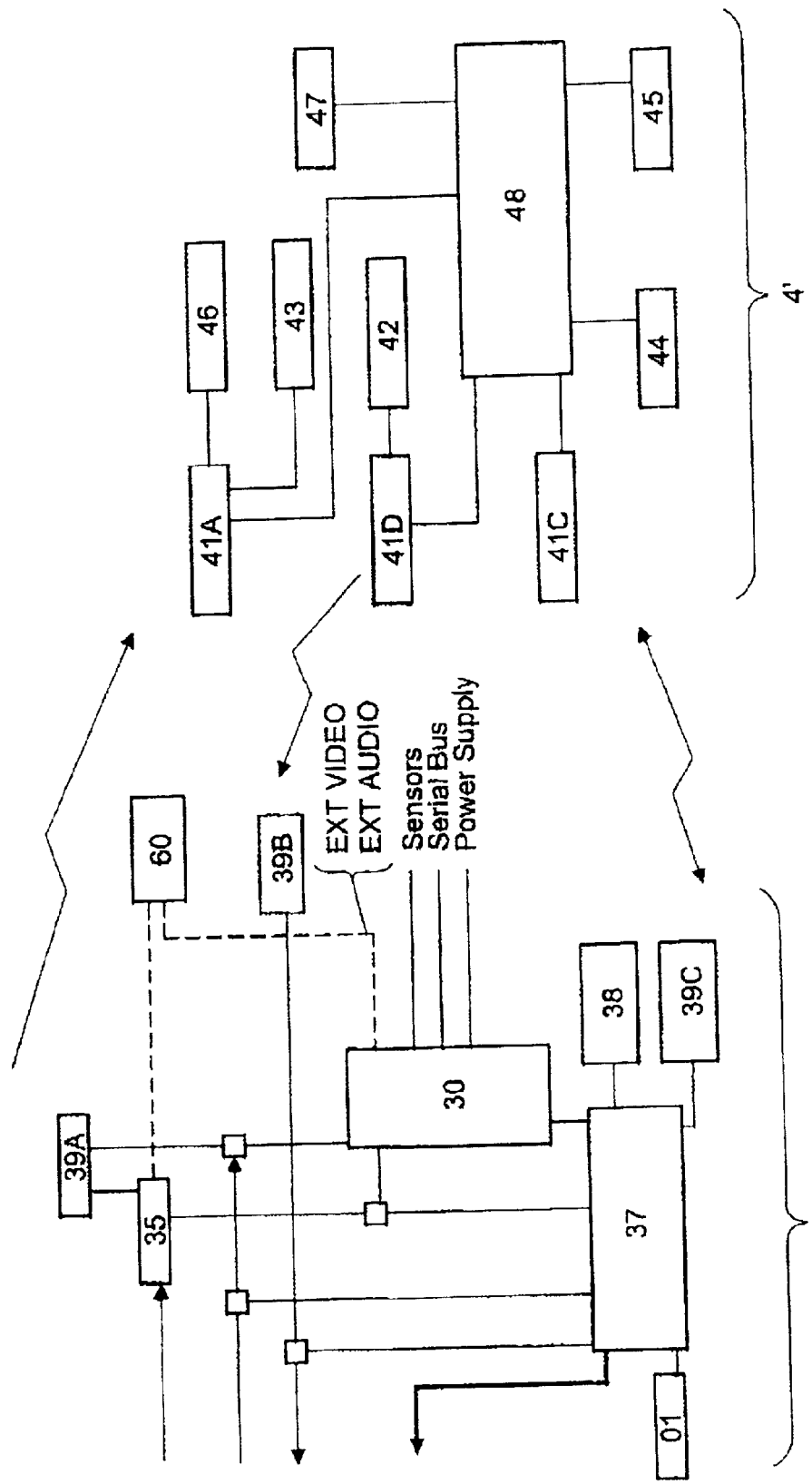
FIG. 5.—This shows schematically the functional blocks of the interior plate (3") employed for a fifth configuration of the electronic door opener referred to in FIG. 1 above, and a portable mobile unit (4') employed in the said fifth configuration FIG. 6.—This shows schematically the functional blocks of a remote localization module (5) employed in some third, fourth and sixth configurations of the electronic door opener referred to in FIG. 1 above, together with their connections with other elements.

The fifth configuration, or basic portable configuration of the door opener, is shown in FIG. 5, where its interior plate 3" and its portable mobile unit 4' can be seen. The fifth and sixth portable configurations are the most advanced versions of the system and are based on the creation of a portable device 4' provided with autonomy, that will perform the same functions as the basic system, but will also endow the owner with greater comfort. The device, similar to a cordless telephone, will permit complete handling of the system from any place in the dwelling. The inclusion of a set of rechargeable batteries 47 with this, together with a liquid crystal screen in colour 46 will permit the person calling to be seen and the audiovisual signals from external devices such as the television set 60 to be reproduced, thus likening it to a portable television.

As well as the comfort that this device 4' can provide, the aesthetic function of same should be mentioned, as with the installation of a portable system such as we propose, viewing the components, such as the monitor and the earpiece of the conventional electronic door openers, on the interior plate is avoided which, in certain dwellings can be anti-aesthetic. When having a portable system, any place can be a good one for its location and it can be located in an easily accessible, hidden place if desired.

To implement the portable system, substantial changes have to be made to the interior plate. These changes consist of the removal of some devices from this and their addition to the portable mobile unit 4'.

Thus, the interior plate 3" for the portable configurations will have the following elements:

The device for writing on screen 35, the read/write memory 38 and the dwelling processor 37 which, as well as permitting communication with its homonym 20 in the entrance hall, will attend to the orders from the mobile unit 4'.

Furthermore, it will be necessary to include radio frequency circuits in the interior plate 3" to send and receive audiovisual signals and also to send and receive data. These circuits will establish remote communication between the interior plate 3" and the mobile unit 4'. Thus, the interior plate 3" will have:

An audiovisual signal transmitter 39A: this circuit will transmit audiovisual signals that come from the entrance hall, the messages recorded in the digitalisation, registration and control block 2, together with the output signals of the corresponding modem 50. By means of a switch, we shall be able to select the signals from an external device as input signals to the modulator, connected to the "exterior video" and "exterior audio" inputs of the connectors 30 of the interior plate. If we connect the video and audio outputs of the euroconnector of the television set 60 to these inputs, these signals will modulate and transmit to the mobile unit 4', in this case being able to view a television channel.

Audio receiver 39B: this circuit will receive the audio signal from the microphone 42 of the portable mobile unit 4' which, once demodulated, will be able to be heard, as wished, over the loudspeaker 13 of the entrance hall or on reproducing devices external to the dwelling such as a telephone 80 or a computer 70.

Data transceiver 39C: for the transmission/reception of commands, we shall need another circuit, via radio or infrared, to operate with digital data. This circuit will put the dwelling processor 37 in contact with the processor 48 of the portable mobile unit 4' by means of a communication protocol that permits both processors to execute the remote orders coming from the other side of the line.

The other devices (keyboard 31, monitor 36, loudspeaker 34, microphone 33 and indicators 32) will be able to be removed from the interior plate 3", passing on to form a part of the mobile unit 4', but with other references as they can show differences in adapting to this mobile unit 4'. Thus, the aforementioned devices correspond to the keyboard 44, the LCD colour screen 46, the loudspeaker 43 and the microphone 42 shown in FIG. 5.

In the door opener in this example, the remote control module can be treated as a remote control 4 or the portable mobile unit 4'. This module 4 or 4' is optional for the basic configuration and obligatory for the portable configurations. As indicated by its name, it permits remote control of the system. The addition of the remote control module 4 imposes the introduction of at least one audiovisual signal transmitter circuit 39 in the interior plate 3' that transmits audio and video on a particular television channel. By tuning the television set 60 on this frequency, the audiovisual signal will be reproduced at the input to the system by the screen and the loudspeaker of the aforementioned television set 60.

On the other hand, the interior plate 3' will be capable of receiving the audio signals from the microphone 42 of the remote control 4 to be routed to the loudspeaker of the street plate 1, to the digitalisation, registration and control block 2 or a modem 50. In the same way, the plate 3' will be able to receive orders from the keyboard 44 of the remote control 4 that will permit the door of the entrance hall to be opened, the system to be configured, messages to be reproduced, etc.

Figure 4:
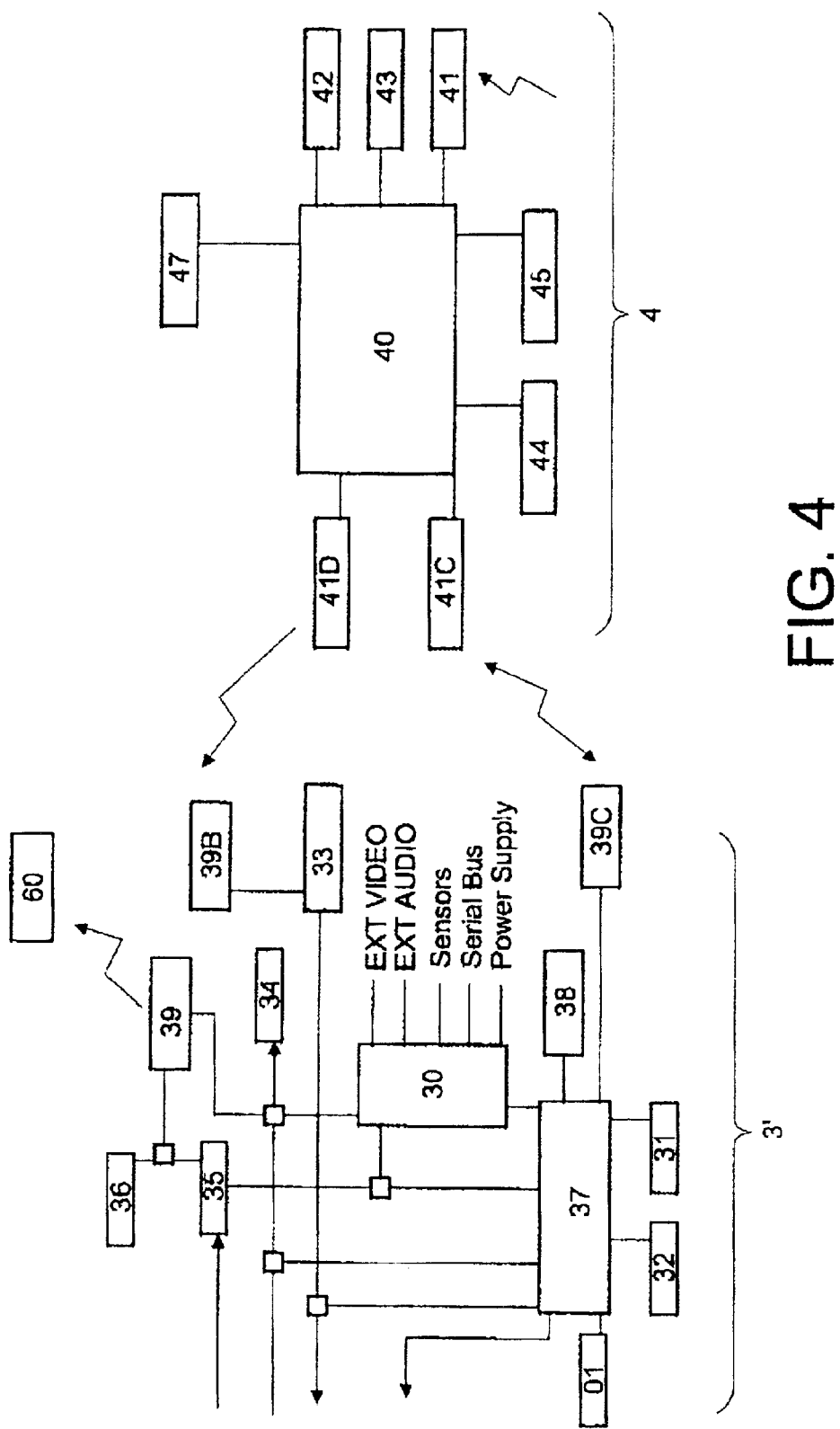
FIG. 4.—This shows schematically the functional blocks of the interior plate (3') employed for a second configuration of the electronic door opener referred to in FIG. 1 above, and a remote control (4) employed in the said second configuration.

The basic configuration with the remote control 4 is shown in FIG. 4. The following elements will have to be added to the corresponding interior plate 3' (with respect to interior plate 3 of the basic configuration):

Transmitter on television channel 39: this device will transmit a signal via radio that will simultaneously contain the analogue audio and video components from the entrance hall. It will permit scenes to be viewed and heard on a monitor or external television 60 suitably tuning a television channel 60 to the transmission frequency.

Data transceiver 39C: for the transmission/reception of commands, we shall need another circuit, via radio or infrared, to operate with digital data. This circuit will put the dwelling processor 37 in contact with the processor 48 of the portable mobile unit 4 by means of a communication protocol that permits both processors to execute the remote orders coming from the other side of the line.

Audio receiver 39B: this will receive the signal captured by the microphone 42 of the remote control 4 and will direct it to the loudspeaker 13 of the street plate, the modem 50 or the digitalisation, registration and control block 2.

On the other hand, the remote control 4 will be composed of:

Control circuit 40: the remote control will have a control circuit that will permit a convenient interconnection of all the devices of which the remote control 4 is composed. For the basic configuration, due to the limited actions of same, it will be possible for the control circuit 40 to be created without the need to introduce a microprocessor.

Data transceiver 41: similar to the 39C previously referred to.

Audio receiver 41: similar to the 39B previously referred to.

Audio transmitter 41D: this will transmit the signal captured by the microphone 42 of the remote control 4 and will direct it to the audio receiver 39B of the interior plate 3', so that this can be directed in turn to the loudspeaker 13 of the street plate 1, the modem 50 or the digitalisation and control block 2.

Microphone 42: this will permit dialogue with the person calling from the street plate 1.

Loudspeaker 43: the loudspeaker of the remote control will reproduce the audio captured from the entrance hall together with the messages recorded.

Keyboard 44: the remote control will have a keyboard similar to the 31 of the interior plate 3' by means of which the entire system will be able to be handled.

Indicators 45: in the same way, the remote control 4 will include luminescent and sound indicators with the object of alerting the user of messages pending, external calls and, in general, support functions for people with hearing deficiencies.

Batteries 47: these will permit the remote control 4 to have autonomy. These batteries 47 will be able to be rechargeable or not as wished.

On the other hand, the portable mobile unit 4' that is shown in FIG. 5, permits the reproduction of scenes in real time and audiovisual messages and although this is a more advanced device than the previous remote control 4, the components are similar to those of which this control 4 is composed with the following exceptions:

Audiovisual signal receiver 41A: this permits the reproduction of the audiovisual signals received by the mobile unit 4' on the liquid crystal display 46.

Data transceiver 41C: similar to the 39C described for the interior plate 3".

Audio transmitter 41D: this will transmit the signal captured by the microphone 42 of the mobile unit 4' and will direct it to the audio receiver 39B of the interior plate 3", so that this can be directed in turn to the loudspeaker 13 of the street plate 1, the modem 50 or the digitalisation, registration and control block 2.

Monitor 46: as we have already commented, the monitor 36 that includes the interior plate 3 for the basic configuration, will be able to disappear passing on to form part of the mobile unit 4'. In this case, the monitor 46 will consist of a liquid crystal display in colour of reduced size and will permit scenes to be viewed without the need to move about or to turn the television set 60 on.

Processor circuit 48: due to the complex functions that it performs, the mobile unit 4' will need to include an added microprocessor.

Lastly, the mobile unit 4' will have a keyboard 44 for control in the configuration, and also to make telephone calls, a loudspeaker 43 and a microphone 42 that will permit dialogue with the person calling via the street plate 1 or by means of a telephone and reproduce the audio signal of the television set 60.

Figure 6:
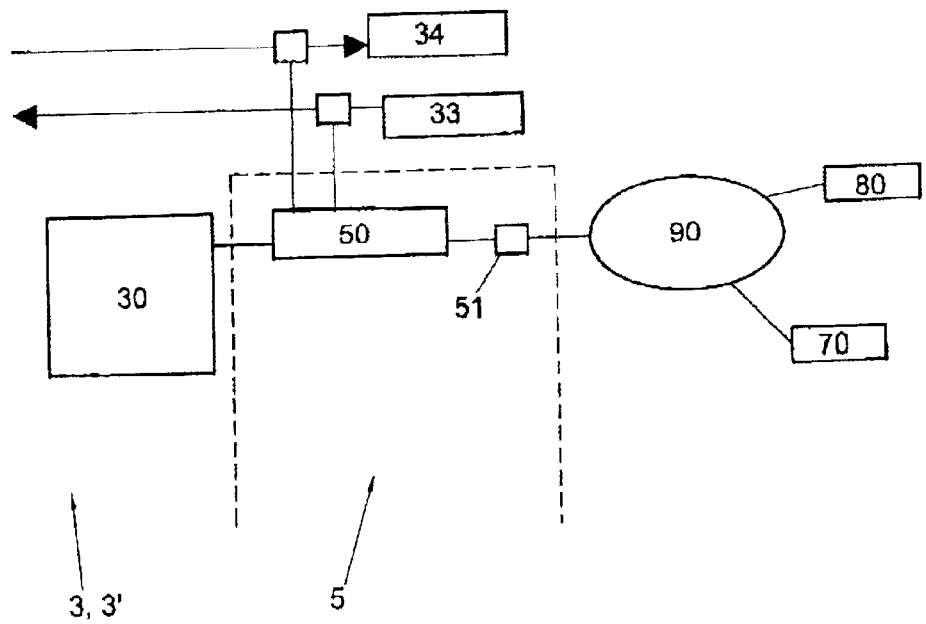

When the remote localization module 5 is included in the door opener system, we have to add a telephone modem 50 to the interior plate 3, 3' or 3" or to the digitalisation and control module 2 (as can be seen in FIG. 1), both for the basic configuration and for the portable configurations. This circuit will have the task of managing the system telephone calls, permitting the remote opening of the entrance hall door and establishing the connection with the person calling the dwelling. The fact of locating the remote localization module 5 in the entrance hall, together with the digitalisation, registration and control block 2 supposes an important saving in costs, as with a single module all the dwellings will have the corresponding services. The devices that make up this module 5, shown in FIG. 6, are the following:

Telephone line 51: a telephone line will be necessary to establish connection with the outside. This line will be able to be the same as that owned by the owners of the dwelling, it can be shared for other uses and will permit the use of the system for locating the owners wherever they may be, if they have a mobile telephone, or in certain places via fixed telephones. Once the owners have been located and the connection established, the two speakers will be able to converse without any problems. Where necessary, the owner will be able to open the entrance hall door from the telephone by pressing a key or a pre-established combination of these. The system will be able to operate with various types of line with the object of not depending on a particular telephone operator. Depending on the type of line, of course, we shall need one type of modem or another.

Modem 50: this will permit the connection between the speaker in the entrance hall and the owner via a telephone line, together with the transmission and reception of data between a remote telephone 80 and the door opening system, to reproduce and record messages. In the same way, it will permit the modification of the absence message and will be able to record a new one at any time via a remote telephone 80. In the absence of the owners, the modem 50 establishes communication after the telephone ring is heard various times. Once the connection with the door opening system is established, the remote user will be guided by means of audio menus, to correctly execute the orders desired. In this way, it will be possible to configure the alarm functions, the home automation functions, reproduce messages, record messages, etc. Furthermore, the modem 50 will provide the system with telephone and automatic answer functions. On the one hand, it will permit the use of the door opening system with a conventional telephone and, in the case of absence, it will reproduce the absence message on the answer phone. Lastly, this modem will provide remote access to the system via a computer 70. In this case, as well as being able to perform all the functions described above, we can also reproduce the video components. The remote connection software will be adapted to the speed of the line, permitting audio reproduction in real time and video according to whether the line permits it. If we operate with ADSL (Asynchronous Digital Subscriber Layer) or an IDSN Line (Integrated Digital Services Network), the speed will be greater that when we operate with a BTN (Basic Telephone Network) line. Depending on the type of modem 50, we can also have other characteristics such as the identification of the number of the incoming call, sending of all types of digital data, hands free, together with connection via fax. In the case of employing a GSM modem we shall also have the possibility of sending and receiving SMS messages.

The general functioning of the electronic door opener that we have described is the following:

Every time a key 14 of the street plate 1 of the electronic door opener, corresponding to a dwelling, is pressed, the bell 01 will ring in the interior of same, alerting the people in the interior to the existence of a call. The owners will be able to view the person concerned on the screen of the monitor 36 of the interior plate 3 or via the television set 60 and if they consider it convenient they will be able to open the entrance hall door by pressing the opening key on the keyboard 31 of the interior plate 3.

When we press the bell repeatedly, and/or after a convenient waiting time (both parameters being configurable), if the owner does not reply, the digitalisation, registration and control block 2 will take control of the situation and the following will occur:

The main processor 20 locates the place where the absence message of the owners being called is recorded in the memory 21 and reproduces the absence message corresponding to the dwelling called via the entrance hall loudspeaker 13. In this way, the person calling is informed that the owners are absent or an indication is given to him/her of where they can be found. As an example, we can consider messages of the following type: "We are Ann and John, if you want to leave a message please press the bell again" or "Helen, we are at the hospital, because Ann is not very well, wait till we return", etc.

As we can see, the system permits the message to be modified accordingly. Furthermore, as we can see in the text of the first example, the system itself can invite the person calling to leave a message.

Let us suppose that the person calling wants to record a visit message. Then press the key or combination of keys indicated in the absence message and the system will reply with an audio message similar to the following one:

"You have twenty seconds to record a message, please start when you hear the signal." Once the signal indicated sounds, the camera 11 and the microphone 12 will start to capture the video and audio corresponding to the message. From the start of the recording, the video and audio signals will be captured by the A/D converters 22, processed and suitably compressed with the aid of the auxiliary video and audio memories and finally stored in the main memory 21. For control of this process, it is obvious that we shall require the aid of the processor 20 that in part will be responsible for synchronising the signals.

In the same way, we shall be able to record a message for all the members of the owners' association. It will be sufficient to press a combination of keys (access code), that the system will validate immediately. If the code is correct, an audio message will be reproduced similar to the following one: "You have thirty seconds to record a message intended for this owners' association".

The message recorded by this method is available for the members of the owners' association, without the need to make a replica for each one of these, as the message will be characterised as belonging to the association and will be duly deleted automatically by the system when a particular period of time has elapsed.

This characteristic of the system may be approved by the chairman of the owners' association, by the building administrator, etc. and will permit meetings to be called and notifications of general interest, for the entire association, in an agile and simple manner.

With respect to the reproduction of visit messages left previously, when the owners return to their dwelling, they will find an illuminated indicator 32 blinking in their interior plate, alerting them to the existence of recorded messages. There will be two options for reproducing these messages:

The first option will be to implement the reproduction of these on the monitor 36 of the interior plate 3. For this it will be sufficient to press the reproduction key (or combination of keys). When we press the reproduction key, the microprocessor 37 of the interior plate will request the data in the message from its homonym in the entrance hall 20 which will access the main memory 21 in search of information. Once the information has been located, it will de-compress it with the aid of the de-compressors 27, process it and convert it into an analogue signal by means of the converters 23. Where necessary, these signals will be suitably amplified and filtered by means of stages 29, so that the reception of them in the interior plate 3 will be adequate. In this case, the message will be reproduced via the monitor 36 and the loudspeaker 34 of the interior plate 3.

The second option consists of using the remote control module 4, in such a way that we can reproduce the message on a particular channel of the television set 60, by merely pressing the key for reproducing messages incorporated in this. When this key 44 is pressed, we shall act on the data transceiver 41C which will transmit a radio frequency signal to the interior plate 3'. This signal will be received by its homonym 39C and interpreted by the dwelling processor 37 that will be programmed for performing the reproduction functions in the first option. The system will take the compound analogue video signal from the digitalisation and control module as the input video, modulate it to the frequency of the required channel and transmit it to the television set 60 by means of the television channel transmitter 39. In this case, we shall see the video sequences on the screen of the television set 60 and we shall hear the audio on its loudspeaker.

The reproduction of the messages will also be possible on an external monitor or television set 60 by connecting the video and audio output to the corresponding inputs. For viewing on the television set 60, in this case, the external video/audio input channel will have to be selected.

If we have one of the portable configurations we shall be able to perform the above functions using the mobile unit 4'. In this case, as well as the above options, we shall also be able to implement the reproduction via the liquid crystal display 46 incorporated.

Furthermore, if the system includes the remote localization module 5, we shall be able to reproduce the visit messages deposited from a remote telephone 80 or from the screen of a remote computer 70 with the remote user software, When the reproducing apparatus makes the reproduction of the video possible, the date and time of recording the message will appear on the scenes, with the object of allowing the owner to know how old this is. In the same way, numeric type signs will appear indicating the number of the message that is being reproduced on all those existing. In the case of the message number 2 out of a total of four being reproduced, 2/4 will appear on the screen.

Another example of signs could be that, when the reproduction of the message is complete and in the case of further recorded messages existing, the system will indicate the existence of further unread messages to the owner by means of icons or characteristic symbols that will appear on the viewing screen.

With respect to the deletion of messages, once the visit messages have been viewed on the screen, they will be able to be deleted, using the keyboard 13 of the interior plate 3, the remote control module (remote control 4 or mobile unit 4'), via a telephone or a remote computer 70 according to the availability of the modules necessary. If you do not want to attend to the deletion of messages, the system will be able to delete them automatically once a few days have elapsed or when a pre-determined number of these exists. In the latter case, the messages will be deleted according to the date of recording these, the oldest of these messages being deleted first.

On the other hand, we shall be able to modify the absence message and that of the answer phone from the interior plate 3, by means of the remote control 4, via the mobile unit 4' and even remotely via a telephone 80 if the system has the remote localization module 5.

To modify the absence message, it will be sufficient to press the keys in an adequate manner and when the system indicates that we can start the recording, use the microphone 33 to enter the audio signal in the system. The digitised audio will be written in the memory address destined for storing these messages (every dwelling will have a memory address), by overwriting the previous one.

To be able to use the door opening system as an automatic answer phone, it is necessary to have the remote localization module 5. Once this module has been installed in a particular dwelling, the system recognises the existence of it and enables the telephone and answer phone function automatically. To record or modify the answer phone message, it will be sufficient to follow the similar process described in the previous point.

As we can check, in some of the cases described in previous points, any action or order of the system can be protected by using the system for inadequate handling and use. At the same time, we can prevent the most delicate parts of this, such as the alarm and home automation functions, being easily accessible to children.

The proposed system permits the reproduction of an isolated sound, musical tones or a spoken message every time that anyone presses the entrance door bell of our dwelling, these being able to be selected from the configuration menu. In this way, we can help people with hearing problems to hear the bell 01 better. Also, thanks to the external connectors of the block 30 we shall be able to add a louder siren to the system and also illuminated indicators so that when anyone calls these are enabled, instead of the conventional bell.

In order to configure the system, menus will be implemented. These menus can be of two types: text menus: whose generation is the task of the write device on screen 35 or the audio device that will consist of pre-recorded spoken messages, that contain the menu options. Let us look at the way that the devices can access these menus and the devices used to do so:

Text menus: viewing text menus will be possible in all the reproducing devices that support video (monitor of the interior plate 36, liquid crystal display of the remote unit 46, television set 60, remote computer 70, etc.). When we press the switch for configuring the reproducing device, an option menu will appear on the screen of this such as the following, for example:

Configuration Menu
1.—Messages.
2.—Date and time.
3.—Telephone numbers.
4.—Adjustments.

If one is pressed, a sub-menu could appear such as the following:

Message Menu
1.—Reproduce messages.
2.—Delete messages.
3.—Send messages to the members of the owners' association.
4.—Modify messages.

In this way, we shall be able to configure the system in a simple manner. The text messages will be able to overlap the video shown by the reproducing device and not at will.

Audio menus: The audio menus will be more suitable when we use reproducing devices that do not permit viewing the video such as a telephone, street plate 1, etc., for example. In this case, the system will reproduce a spoken message with the menu options. When the valid key is pressed, the corresponding sub-menu will be launched and so on successively.

Both the text menus and the audio menus will be stored in the main memory of the system 21 that we shall access every time that we execute an action required.

Furthermore, there will also be informative menus on:
General information on messages, date and time.
Calendar.
Emergency telephones, etc.

With the object of adding functions to the system for safeguarding the dwelling, a call forward function is available to any neighbour/s or pre-determined telephones.

To implement the call forward function in other dwellings in the block, two users of the system at the very least will have to operate it. The first of these will be the owner of the dwelling that wishes to perform the call forward and the second user will be the owner of the dwelling to which the calls are to be forwarded. The first of these will indicate the dwelling to which his calls will be forwarded to the system, by means of a menu option or by a command and his secret code. The system will know that a request for call forward exists, but will not attend to it until the owner of the receiving dwelling indicates that he/she wishes to receive the calls from the dwelling of the first owner.

The menu deployment in this call forward function can be as follows:

Call Forward Menu
1.—Forward to dwellings.
2.—Forward to telephones.
3.—Acceptance of forwards.

Forward to a Dwelling
1.—Indicate the number of dwelling/s to which the calls are to be forwarded.

ACCEPTANCE OF A FORWARD

1.—Indicate the number of the dwelling/s that will accept the calls forwarded.

In this way, the owner of the first dwelling will access the "call forward" menu and will write in the "forward to dwellings" sub-menu the number of the second owner's dwelling. The owner of the second dwelling will carry out the inverse process, entering "forward acceptance" in the sub-menu and indicating the number of the first owner's dwelling.

Thus, all the calls made from a street plate to the first owner's dwelling will be heard in the bell of the interior plate of the second owner, confusing any possible intruder with regard to whether the owner is at home or not.

If the owner of the receiving dwelling is not at home either, the absence message belonging to the transmitting dwelling will be triggered and if the person calling decides to record the message, it will be stored in his message box.

The call forward function can be applied as often as required and the same owner can store various forwards.

Another of the functions that the system permits in its basic configuration is the AUTO-MESSAGE function.

We give the name auto-messages to messages sent by a user to another or others residing in the same dwelling. This function will take the place of the typical notes that are often left written about the house.

Auto-messages are likely to be recorded from any device that can be connected to the system, interior plates 3, 3', 3", street plate 1, local or remote telephone 80 or remote computer 70. The reproduction of the auto-messages themselves will be performed from any of the previous devices.

The system for this example permits the configuration of services. The system is governed by a database, stored in the main memory 21, which contains the information on configuration for each dwelling, together with the messages recorded. This fact permits functions to be deleted or added by dwelling. That is to say, the recording of messages from an external telephone, connection to the system via a remote PC or not, etc., can be enabled/disabled for a particular dwelling, in such a way that the system can have all the functions for one particular neighbour and the system will only serve to view the person from the entrance hall and open the door for another.

With the object of simplifying the use of the system, a self-management function has been provided that permits the oldest read messages to be deleted automatically. In this way, the user does not even have to learn how to delete stored messages as, once a definable period of time has elapsed, the system automatically deletes them.

As well as the auto-messages, audio messages which may be directed to a particular neighbour or the members of the owner's association can be recorded via the interior plate 3, 3', 3".

Another of the characteristics of the door opening system, in this example, consists of the possibility of providing the system with automatic recording of the person calling via the keyboard of the street plate 1. In this way, independently of whether the person leaves a message or not, the system will take an audiovisual sequence of the person calling, which will permit him/her to be identified in the case of an occurrence to the authors of same.

These sequences will be generated and destroyed by the system itself and will only be able to be reproduced by using the secret password for the system.

The interior plate 3, 3', 3" will have the connector block 30 for input and output that will be able to be used for connecting external devices. These devices will be able to provide the system with very interesting functions such as the alarm function. It will be possible to connect devices both on input (mainly sensors) and output (circuit breakers, relays, sirens, etc.). All these will have three lines, one for supply, another for earth or mass and an input and output analogue line according to the type of device. Depending on the connector used, the system will automatically recognise whether it is an input device or, on the contrary, an output device. Once connected, the configuration menu will have to be accessed to indicate whether the device is enabled on the ascending or descending side and which event is associated with which device. In this way, it will be possible to associate a smoke detector with the triggering of a siren or a presence detector by dialling particular telephone numbers. The external connections can be very useful for providing the system with the services that the user him/herself may conceive.

We could have, for example, a complete alarm system and even some home automation functions such as the turning on and off of devices, simulations of presence, opening of an access door to the dwelling, etc.

Due to the difficulty involved in the installation of a large number of electricity lines in dwellings, the greater part of the devices and systems aimed at the dwelling operate with serial type buses. All of the systems intended to be implemented and the home automation standards PROFIBUS, EIB, etc. and the electronic standards 12C, CAN, RS232, etc. have the use of two lines for data transmission in common. The possibility of connecting to the device system by means of a serial bus opens many possibilities for new developments and existing systems can be coupled to the present system immediately.

On the other hand, the remote localization module 5 will permit a search pre-established by the owners to be carried out, by using any telephone system installed in the owner's dwelling. The activation of this module 5 will be carried out in the following manner:

Let us suppose that after calling a dwelling, an absence message is triggered such as the following one:

"Hi, we are Ann and John, if you want to record a message, press the bell again. If, on the other hand, you need to locate us, type our remote localization code."

After typing the code correctly, the user will receive the following message:

"Code correct, if you want to call John's mobile press 1, if you want to call Ann's mobile press 2, if you want to call John's work press 3, etc."

After pressing the number required, the system searches for the number requested in the database and establishes telephone communication with the owner, putting the two speakers in contact. Once the communication is established, the remote speaker will be able to talk to the person in the entrance hall, as if it were a telephone conversation. If the owner wishes, by pressing a combination of keys that only he knows, he will be able to open the entrance hall door.

You can go even farther by means of the connector block 30 as, by incorporating an automatic opening system, we could open the private access door remotely.

Also, the system itself can make use of the remote localization of the owners automatically, when a sensor is triggered. In this case, it will search for the telephone numbers to ring in the memory and will try to establish connection with the owners, with an alarm centre or with the police, as wished. Once this connection is established, an audio message will be produced indicating the cause of the alarm being triggered, together with the relevant data.

By means of the door opener proposed in this example, the entrance hall door will also be able to be opened from the entrance hall itself, using the access code. In this case, the control system itself will perform the action after checking that the code is correct. This function can be useful when we forget the entrance hall keys, so that the children will not be left in the street when their parents are not at home, for waiting the arrival of the owners in comfort in a possible reception room located in the entrance hall, for avoiding the postman having to call every day, etc.

To have the telephone function in this door opener, it will also be necessary to have the remote localization module 5 installed. This module 5 includes the modem 50 that permits the telephone function.

When someone calls at one of the dwellings in the building via the telephone, after waiting for a number of rings or a particular time (both parameters can be configured by the user), the system will send the modem 50 the necessary orders for taking the incoming call. Following this, the absence message in the answer phone will be triggered and this will be reproduced on the earpiece of the telephone of the person calling. After reproducing the absence message, it will permit an audio message to be recorded that the owner will be able to reproduce later.

If the owners are at home when the call occurs, they can take the call from the telephone in the interior plate 3, from the remote control 4 or from the mobile unit 4' (according to the door opener model they have), by merely pressing a key. From this moment on, the connection is established and the microphone and loudspeaker of the reproducing devices will be used respectively for capturing and reproducing the audio necessary for talking.

When working in telephone mode, the system operates in the following manner. Every time that the incoming call acceptance button is pressed, the reproducing device sends the order to the dwelling processor 37 which, in turn, translates this order and sends it to the modem circuit 50. In the same way, when the key for making a telephone call is pressed, the system will permit a series of numbers to be entered that will be viewed on the reproducing device as they are pressed. Once the number to be called is formed, we press the key for establishing the call. At that moment, the dwelling processor will send the start commands necessary to the modem 50 together with the number to be dialled.

With respect to the mobile unit 4', one of its most attractive characteristics is that it permits the reproduction of a conventional television set signal. As indicated, the portable mobile unit 4' includes an audiovisual radio frequency receiver device 41A and a radio frequency signal data transceiver 41C corresponding to digital data. When the channel A selection key is pressed, we shall send a command to the interior plate 3" via the data transceiver 41C. The dwelling processor 37 will interpret and select the video input A corresponding to the entrance hall or the digitalisation and control module. In the same way, when we wish to reproduce the signal of the television set 60 on the liquid crystal display 46 of the mobile unit 4', we press the key for selecting channel B. The data transceiver 41C will send a command (different from the previous one), to indicate that it is switching to the input channel B to the dwelling processor 37. In order to achieve the portable television function, the video out and audio out signals of the television set in the dwelling 60 will be connected to the video and audio input connections respectively of the interior plate 3". Another way of viewing the television set 60 in the mobile unit 4' without the need for making the cableform connection from the television set 60 of the interior plate 3", would be by means of connecting the video out and audio out signals of the television set 60 to a transmitter module similar to the 39A. Depending on the needs of the user, the use of the one or other method will be the more convenient, the second one being the most viable in those cases in which a certain complexity exists in making the connection via cable. If, on the contrary, this connection is foreseen in the construction of the dwelling, the first method economises the cost of the system.

A possible implementation of the invention for a building of dwellings and in the case pf the recording and reproduction of an audiovisual message is described below.

Figure 7:
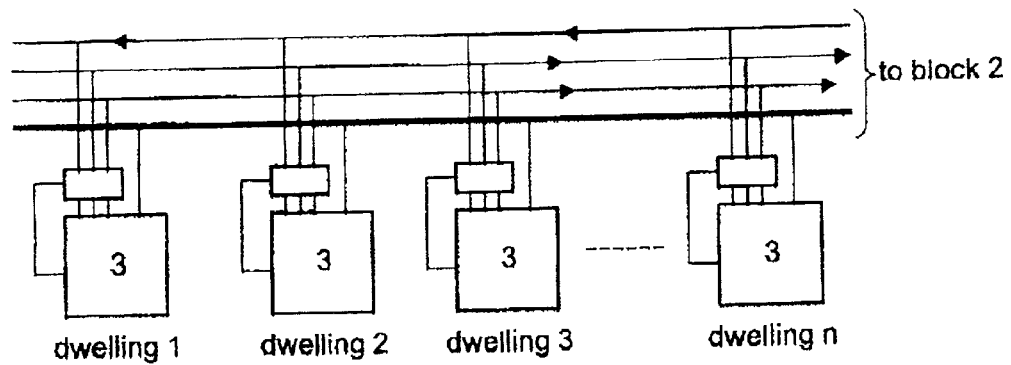
FIG. 7.—This shows schematically the layout of various interior plates (3) in their connection inside the electronic door opener referred to in FIG. 1 above and applied to a number of dwellings.

Thus, a street plate 1 is used with all its components, camera 11, microphone 12, loudspeaker 13, keyboard 14, indicators 15 and opening switch 16. An interior plate 3 is also used complete with the basic configuration, that is with its monitor 36, loudspeaker 34, microphone 33, keyboard 31, device for writing to the screen 35, bell 01, etc., as shown in FIG. 3. Furthermore there is a cable connection according to FIG. 7, where all the dwelling processors 37 are connected to the main processor 20 of the block 2, this main processor 20 is the one that selects what will transmit and receive.

Let us suppose that the digitalisation, registration and control module is made up of a computer that has a card for capturing audio and video, together with an input and output card. The card for capturing audio and video permits analogue audio and video to be captured, both signals to be digitised by means of A/D converters that it has incorporated and compressed in various formats (MPEG, AVI, MJPEG). Once compressed in the memory, they will be synchronised and stored in a digital file that will be deposited in the hard disk of the computer.

These capture cards are also capable of performing the inverse process, that is to say, given that there is a file recorded by the above method, the card is capable of de-compressing it and converting it into two synchronised analogue signals, one audio and the other video, the resulting signals being an exact replica of the original.

With regard to the digital input and output card, this has the task of controlling the devices outside the computer. For this, by means of a programme that we can make to measure, supervision of up to 128 inputs and outouts in parallel is permitted. If we have this device (it could be more modest, depending on the building in question), by connecting the digital inputs to the keyboard 14 of the street plate 1, we can easily check when a call is made to any of the dwellings in the building.

In the same way, the outputs of this card will, in our case, permit the implementation of the communication protocol with the dwelling processors 37, the selection of devices that transmit and those that receive the audiovisual signals and also the enabling of the switch relays 16 of the entrance hall door.

On the other hand, the computer that substitutes the main processor 20 and the memories of the digitalisation and control module 2 in this example, will also contain software routines for capturing and operating with audiovisual signals and routines for handling the control card and information on the configuration parameters for each of the owners of the dwellings in the building.

This information, in our case, will be stored in databases that will contain updated data on all the variables that intervene in the process. Let us see how this system operates overall:

When a person presses any of the bells for the dwelling, the input and output card referred to above detects a selected inout. At this moment, it checks the dwelling it is calling and starts to record a short sequence that could serve to identify the supposed delinquents in the case of an occurrence. Simultaneously, the system will have stored the date and time that the call was made in a database, together with the door the call was made to and the name of the file where the said short sequence was recorded. If the owner does not reply, after a certain time has elapsed, the system searches for the name of the file containing the absence message for the dwelling in question in the main database and sends it to the audio output of the capture card, it being reproduced in the loudspeaker 13 of the street plate 1. After the reproduction of the absence message, the system once more reads, from the database, the instructions that the user calling has to follow to permit him/her to record a message, open the entrance hall door or locate the owners remotely.

For this, the system remains in waiting for a time (which can be configured by the owner) for the person calling to press the combination of keys necessary for starting one of the above processes. Let us suppose that he/she decides to record a message and presses the combination "1, 2, 3, 4", for example. On each press, the system reads the value of the datum it receives via the input and output and compares it with the number (access code) stored in the database. If the number is correct, the action requested will be executed, if it is not, an audio message will be reproduced that indicates the occurrence.

Let us suppose that the number entered is correct. In this case, the system will reproduce an audio message that will indicate to the user the time that he/she has for recording and transmitting a signal to indicate the start of the recording. At this moment, the person will be able to speak via the microphone 12 of the street plate 1 and both his voice and image captured by the camera 11 will be recorded in real time in a file that will be stored in the corresponding hard disk.

Immediately after the completion of the recording, the main processor 20 will communicate, via the entry and exit card referred to previously, with the dwelling processor 37 to indicate that it has unread messages. The latter, in turn, will enable an illuminated indicator that blinks in the interior plate 3 with the object of alerting the owner to this fact.

On their return, the owners will observe the existence of messages and will be able to reproduce them in the interior plate 3 in the following manner:

When the owner presses the key for reproducing messages, the dwelling processor 37 will request the message in question from the main processor 20. The latter will search in the main database whether messages exist for the dwelling making the request and, if there are any, will immediately start to reproduce the first. Now, the reproduction will be performed on the loudspeaker 34 of the interior plate 3 and not on the street plate 1. This is due to the fact that the input and output mentioned previously, receiving the order from the main processor, will have disconnected the line that sends the audio to the loudspeaker of the street plate 1. The video will be sent to the monitor 36 of the interior plate 3 and, together with it, the data on the date and time at which the message was recorded. These data will be collected by the dwelling processor 37 in question and overlapped on the video with the aid of the device for writing on screen 35. The result is that the owner will be able to view and hear the message correctly and know the date and time of its recording.

On the other hand, in the case of the modem 50 being the cordless type (GSM modem or future versions of this such as GPRS and UMTS), the system will be provided with the possibility of sending and receiving SMS messages. The following functions will be possible via these messages:

a) Sending an SMS message to a particular dwelling:

A cordless modem, the same as a conventional line modem, has an associated telephone number, so that a voice, fax or data call can be made, in addition, and a GSM modem permits SMS messages to be sent or received. Distinguishing the type of incoming call is automatic by a call discriminator possessed by the modem itself. The system can recognise to whom the message is addressed in two ways:

By associating telephone numbers with each dwelling:

We know that when we send an SMS message from a mobile telephone, we automatically include our telephone number in the header of the message, so that the receiver device (whether another mobile telephone or a modem) can identify the device making the call.

We shall associate telephone numbers with each of the dwellings in the building in the main memory of the system 21 where the system databases are located, in such a way that when the system receives an incoming call with an SMS message it can know the dwelling to which it is directed.

By sending a special header in the body of the message:

Another way of recognising the dwelling to which the message is directed is by including a specific text header in the body of the message. For example, to send a message to the dwelling 12 in the building, it will be sufficient to head the message with the text:

V12 Hello John

Furthermore, it will be possible to protect reception by means of a compulsory secret code that will be written following the above text, the header being as follows:

[Number of dwelling] [secret code]

The above example would be as follows:

V12.5674442 Hello John

As opposed to the previous method, this way permits the use of any mobile telephone for sending the message to a particular dwelling, without the need for it having been entered in the database beforehand.

By using either of these methods, the system will extract the header of the message and proceed in the following manner:

Once the real text of the message has been extracted, the main processor 20 will make a call to the dwelling in question, as if ringing the bell of the street plate 1. Normally, the reaction of the person/s in the dwelling will be to attend to the call. What they will find will be that they can read the text of the message on the monitor, 36 or 46 according to the configuration of the door opener video.

When some seconds have passed, the monitor will switch off and the message will remain recorded in the main memory for later consultation if necessary.

b) Sending an SMS message intended for all the members of the owners' association:

The procedures are similar to those above except that, with the object of not making simultaneous calls to all the dwellings in the building, the system will not enable the bells of the interior plates 3, but will pass directly to storing it in the main memory 21, where it will be accessible to all the dwellings.

c) SMS commands

With the inclusion of a cordless GSM modem, it will be possible to configure the system, request this to be checked, request the reproduction of messages, enable or disable home automation devices or alarms by using SMS messages.

Let us look at the way to do this:

In principle, the system will have a set of commands that will tell it to perform one or another action when being included in an SMS message. If, for example, we send a message, the body of which contains the word "HELP", we shall be telling the system to send us a message with all the commands available.

Let us suppose that the VMN command indicates seeing new messages. The system will send us a message stating the number of new messages that we have stored in the system and the type of these (community, auto-message, SMS, etc.). Other commands exist for reproducing these messages such as, for example, RMC (reproduce messages intended for the community), etc.

In this case, once the system has received the order, it will immediately call the requesting telephone and when the communication is established, will start to reproduce those messages that are of the type requested. For this, it will search for the files that store the information requested in the main memory 21 of the system and, with the help of the de-compressors 27, the audio processor 25 and the digital/analogue converters 23 would change these files to analogue signals that it will introduce in the audio input of the GSM modem. The result will be the correct hearing of the message in the remote device.

Note that the messages stored by the system can be solely audio or audiovisual in some cases. When the message requested contains video and the said request is made from a device that does not have the possibility of viewing video the main processor 20, with the aid of management software, will extract the audio part of the message and disregard the video information.

When the request consists of reproducing the SMS messages, the system will send SMS messages from the GSM modem directly to the mobile, without the need to de-compress the file or perform any digital/analogue conversion.

If any request is erroneous, or the requesting telephone does not have the permits to act, the system will remain unchanged.

With the object of clarifying the functions that can be implemented from a remote mobile telephone, let us look at a list of commands, as an example:

VMN: View new messages.
RMN: Reproduce new messages.
RMS: Reproduce SMS messages.
GMA: Record an audio message.
GMC: Record a audio message intended for the community.
SIS: Request information from the system.

We shall also be able to enable or disable alarms as follows:

AAS: Enable security alarm.
DAS: Disable security alarm.
AAA: Enable air conditioning.

DAA: Disable air conditioning.

As we can see, in general, we shall be able to perform those functions that we used to perform via audio menus.

Furthermore, the remote localization module 5 can include the following functions, whatever its location and type of modem/s 50:

Support fax connections that can be useful for:
Automatically advising the technical service in the case of a fault.
Sending a summary of calls made by the dwelling.
Sending a summary of the number of calls attended to, number of messages stored, etc.
Serve as a connection for system software updating; so that the different modules can be updated via the system itself.

What is claimed is:

1. An electronic digital door opener, comprising a street plate provided with at least a video camera, microphone, loudspeaker, keyboard, indicators and a door opening switch, said street plate being connected to at least one interior plate in dwellings to enable
audiovisual communication between the street plate and the interior plates;
opening of a door of an access through an order from any of the interior plates;
wherein the electronic digital door opening system comprises a digitalisation, registration and control block that is connected between the street plate and the interior plates; said block comprising
first means for registering, reproducing and processing sound, video and data sequencing,
control means for controlling door opener functions;
each interior plate being permitted to include a remote control module which is enabled to be
a remote control for audio and data communication with the street plate and an audiovisual and data communication with the said street plate via a television set;
a portable mobile unit provided with a display for audiovisual and data communication with the street plate, in a way selected from directly and by means of a television set, said portable mobile unit also being permitted to function as portable television set;
each interior plate, and the digitalisation, registration and control block being enabled to be connected to a remote localization module that permits audio, video, data and control communications of the door opener with at least one communication element selected from a remote computer and a remote telephone, via a telecommunications network; all this which for, according to requirements, making hereinbelow door opener configurations possible for each user:
a first basic configuration comprising a street plate, an interior plate and a digitalisation, registration and control block;
a second configuration comprising a street plate, an interior plate, a digitalisation, registration and control block and a remote control;
a third configuration comprising a street plate, an interior plate, a digitalisation, registration and control block and a remote localization module;
a fourth configuration comprising a street plate, an interior plate, a digitalisation, registration and control block, a remote control and a remote localization module;
a fifth portable basic configuration comprising a street plate, an interior plate, a digitalisation, registration and control block and a portable mobile unit;
a sixth configuration comprising a street plate, an interior plate, a digitalisation, registration and control block, a portable mobile unit and a remote localization module;
the street plate and the digitalisation, registration and control block being shared by all users in a door opener installation comprising a plurality of interior plates and any combination of aforementioned six configurations, and enabling any of six security functional configurations such as capture of video sequences of a person calling at the door opener.

2. An electronic digital door opener, according to claim 1, wherein the digitalisation, registration and control block comprises:
analogue/digital converters for digitalisation of audio and video signals, said converter being unnecessary when corresponding sensors in an installation provide digital outputs;
digital/analogue converters with an inverse function to converters for reconstructing original audio and video analogue signals;
compressors for compressing audio and video signals so as to occupy less space when stored in a memory;
de-compressors with an inverse function compressors for decompressing compressed signals before delivering them to the digital/analogue converters;
video processor for enabling at least one operation selected from zoom, rotating, filtering, contrasting and combinations thereof to be performed with video images captured;
audio processor for enabling at least one operation selected from equalising, filtering, distorting and combinations thereof to be performed with audio sounds;
read/write storage memories for storing at least digitised audio and video signals;
main processor for
attending to orders from the street plate and interior plates;
enabling/disabling different elements of a system;
permitting opening of the access controlled by the door opener;
establishing communications with a plurality of processors in the interior plates;
supervising and controlling capture, sending, synchronising and reproducing audio, video and data signals;
it being possible to implement software with functions of compressing, processing and de-compressing in said main processor so as to make unnecessary the previous compressors, de-compressors, video processor and audio processor in block;
main memory for storing at least a database which makes up a system, access keys, date and time of calls, telephone numbers for remote localization;
amplifying and filtering stages for amplifying and filtering audio, video and data signals.

3. An electronic digital door opener, according to claim 1, wherein the interior plate for the aforementioned first and third configurations described in claim 1 comprises:
a keyboard connected to a processor in a dwelling by means of which a user acts to open the access controlled by the door opener, to reproduce audiovisual messages, to record messages of absence, to enter telephone numbers for urgent localization and, in general, to select options on a menu for configuring the door opening system;
indicators for showing status of the door opening system at all times, providing at least one indication selected from an indication whether there are any recorded messages and an indication if there has been a failure;

a microphone for capturing audio to be listened to by the person who has called from the street plate;

a loudspeaker for enabling to listen to audio captured by the street plate and audio corresponding to recorded messages, it being possible to direct signals received by this loudspeaker to a television set outside the interior plate by means of an "exterior audio" connector and via a transmission system selected from at least a cable and radio frequency system;

a device for writing on a screen for writing characters and symbols on monitors and screens, it being possible for said writing to be overlapped with video signals, said device facilitating to create text menus for configuring the system, said menus being allowed to be viewed on a monitor in the interior plate and/or on the aforementioned television set;

a monitor for viewing
 images captured by the camera in the street plate;
 images recorded by means of the digitalisation, registration and control block;
 menus for configuration of the system;
 it being possible to direct signals received by said monitor to a television set outside the interior plate by means of an "exterior video" connector and via a transmission system selected from at least a cable and a radio frequency system;

a processor in a dwelling communicated with the main processor referred to in claim 2, the processor being selected and identified by the processor in the corresponding communications, the processor
 executing orders coming from the keyboard of the interior plate;
 enabling/disabling indicators in the interior plate;
 generating menus by means of a writing device on a screen;

a read/write memory for storing data employed by the system selected from at least telephone numbers of those to be notified in case of a need for localization, number of non-viewed recorded messages, personal access codes, menu screens and others to be housed;

a connector block comprising at least
 "exterior video" and "exterior audio" outputs;
 inputs for sensors and power supply;
 a serial output bus for acting on external devices;
 the connector block being enabled to be connected to a domotic and/or alarm centre system;

an acoustic warning or bell for indicating that there is a call on the street plate, said acoustic warnings or bell being permitted to be supplemented or substituted by an indication means selected from a warning with sound suitable for people with hearing deficiencies, indicating lights and pre-recorded verbal messages.

4. An electronic digital door opener, according to either of claim 1 or 3, wherein the interior plate for the aforementioned second and fourth configurations described in claim 1 comprises all elements of the interior plate described in claim 3 and further comprises:

a transmitter on a television channel that permits radio transmission of a signal with audio and video components from at least one element selected from the street plate and the digitalisation, registration and control block said signal being transmitted to a television set outside the interior plate; enabling to view and hear image and sound facilitated by the monitor and the loudspeaker of the interior plate in the aforementioned television set by tuning in a channel corresponding to the aforementioned transmission;

a data transceiver that permits transmission/reception, preferably via radio or infrared, of digital commands and instructions between a dwelling processor of the interior plate and a control circuit in the remote control used in the aforementioned second and fourth configurations;

an audio receiver that permits a signal captured by a microphone of the aforementioned remote control to be received preferably by radio or infrared, said signal being directed to at least one element selected from a loudspeaker in the street plate, a modem in the remote localization module and the digitalisation, registration and control block.

5. An electronic digital door opener, according to claim 1, wherein the remote control employed in the second and fourth configurations comprises:

a control circuit for governing functioning of control and for connecting a plurality of elements included in control;

a supplementary data transceiver to the data transceiver and analogous to said data transceiver;

a microphone for enabling to
 communicate with a person calling from the street plate;
 record messages in the digitalisation, registration and control block;

a loudspeaker that permits reproduction of audio from the street plate and audio from the messages recorded in the digitalisation, registration and control block;

a keyboard that permits governing of the entire door opening system;

illuminated and/or sound indicators for warning a user of pending messages and external calls, and facilitating support functions for people with hearing deficiencies;

a block batteries selected from rechargeable and non-rechargeable for providing the remote control with autonomy;

an audio transmitter for transmitting the signal captured by the aforementioned microphone to the audio receiver of the interior plate;

an audio receiver which permits the audio component of the signal transmitted by the transmitter in the television channel.

6. An electronic digital door opener, according to claim 1, wherein the said interior plate for aforementioned fifth and sixth configurations, comprises:

a device for writing on the screen, for viewing the text menus created on a television set outside the interior plate and/or on an existing screen on the portable mobile unit employed in said fifth and sixth configurations;

a dwelling processor keyboard and indicators with respect to which it acts, belonging to aforementioned portable mobile unit;

a memory;

a connector block permitted to direct signals corresponding to "exterior video" and "exterior audio" outputs from the door opener to a television set outside the interior plate by means of a transmission system selected from at least a cable and a radio frequency system;

an acoustic warning device or bell;

an audio receiver microphone from which audio signal is received belonging to the portable mobile unit used in aforementioned fifth and sixth configurations;

a data transceiver which permits transmission/reception, preferably via radio or infrared, of digital commands and data between a processor in a dwelling of the interior plate and a processor circuit of the portable mobile unit used in aforementioned fifth and sixth configurations;

an audiovisual signal transmitter that permits transmission via radio of audiovisual signals from at least one element selected from the street plate and the digitalisation, registration and control block, said signals being transmitted both to a television set outside the interior plate and to an existing audiovisual signal receiver in the aforementioned portable mobile unit; a switch existing in this transmitter that permits to select signals to be transmitted from aforementioned audiovisual signals and those corresponding to "exterior video" and "exterior audio" inputs in which a television set outside the interior plate is connected, so as to enable the portable mobile unit to receive any television channel via its audiovisual signal receiver.

7. An electronic digital door opener, according to claim 1, wherein the portable mobile unit used in the fifth and sixth configurations comprises:

a small screen, preferably of LCD type and in colour;

a small loudspeaker for listening to audio signals;

an audiovisual signal receiver connected to the previous loudspeaker and screen and which permits the reception of audiovisual signals from the audiovisual signal transmitter of the previous interior plate used in the aforementioned fifth and sixth configurations;

a microphone for audio capture transmitted by the portable mobile unit;

an audio transmitter connected to the aforementioned microphone that transmits audio signals to the audio receiver of the interior plate used in said fifth and sixth configurations;

a data transceiver supplementary to the data transceiver;

a processor circuit that governs the aforementioned data transceiver, audio transmitter and audio signal receiver, also controlling the entire functioning of the portable mobile unit;

a keyboard;

indicators;

a battery block which provides the portable mobile unit with autonomy.

8. An electronic digital door opener, according to claim 1, wherein said remote localization module comprises a modem connected on a first end to a telephone line and on a second end to an interior plate, said modem being enabled to be included in the aforementioned interior plate; enabling answering machine functions in said remote localization module.

9. An electronic digital door opener, according to claim 8, wherein said modem is of a type selected from at least GSM, GPRS and UMTS, said modem being a cordless data transmission module.

10. An electronic digital door opener, according to claim 8, wherein said modem comprises means for sending SMS messages.

11. A digital electronic door opener, according to claim 1, wherein the portable mobile unit has an aspect similar to that of a cordless telephone.

12. An electronic digital door opener, according to claim 1, wherein said remote localization module is permitted to be located in an entrance hall beside the digitalisation, registration and control block, so as to all dwellings share services of said remote localization module.

* * * * *